United States Patent

[11] 3,574,324

[72] Inventor George E. Kellogg
 Bougival, France
[21] Appl. No. 805,191
[22] Filed Mar. 7, 1969
[45] Patented Apr. 13, 1971
[73] Assignee General Motors Corporation
 Detroit, Mich.

[54] DISC BRAKE ADJUSTING AND ANTI-KNOCKBACK MECHANISM
 2 Claims, 3 Drawing Figs.

[52] U.S. Cl..................................................... 188/71.8,
 188/196, 192/111
[51] Int. Cl........................................................ F16d 65/54
[50] Field of Search............................................. 188/71.8,
 196 (P); 192/111 (A)

[56] References Cited
 UNITED STATES PATENTS
 2,951,560 9/1960 Smellie......................... 188/196(P)X
 OTHER REFERENCES
 1,260,240 2-1968 German printed application to Ostwald 188/196(P)

Primary Examiner—George E. A. Halvosa
Attorneys—C. R. Engle and F. J. Soucek

ABSTRACT: A disc brake apply piston slidably disposed within a caliper supported cylinder wherein the piston comprises an axially extending extension disposed within a stepped bore of a cap member enclosing one end of the cylinder. The extension also is stepped in form and has a spring member coiled therearound on a major diameter such that wear of the brake linings causes coils of the spring from the major diameter to move onto a portion of a lesser diameter where these coils engage the stepped abutment in the cylinder wall thereby limiting movement of the piston away from the brake disc. This arrangement is dimensioned to provide a specific clearance between the disc brake linings and the rotating braking disc attached to the vehicle wheel. In this manner brake lining wear and brake disc deflection are compensated maintaining a constant clearance so that movement of the brake pedal provides a specific brake applying pressure each time the operator desires to retard movement of the vehicle.

PATENTED APR 13 1971  3,574,324

INVENTOR.
George E. Kellogg
BY
C. L. Engle
ATTORNEY

DISC BRAKE ADJUSTING AND ANTI-KNOCKBACK MECHANISM

This invention relates to vehicle disc brakes and more specifically concerns means for positioning the brake apply piston and regulating deflection of the brake disc.

Heretofore, in the disc brake art, some difficulty has been encountered in maintaining the clearance between the brake applying piston and the associated friction material pads and between the pads and the rotating disc at a specified distance resulting in changes of brake apply rate after the vehicle has been subjected to considerable use. This invention overcomes this situation by specifically positioning the brake apply piston regardless of the brake lining wear through the provision of a coil spring being forced from a major diameter on an extension of the brake applying piston onto a portion of the extension having a lesser diameter which engages an abutment machined in its associated cylinder.

With the foregoing background of the invention in mind, one object of this invention is the provision of a disc brake actuating piston having associated means to specifically position the piston in relation to the brake friction pads.

A further object of this invention is the provision of a disc brake applying piston having automatic adjusting means maintaining a specific clearance between the piston and the brake disc.

Another object of this invention is the provision of a brake actuating piston having an integral stepped axially extending extension receiving a coiled spring which is forced from a major diameter portion of the extension to a minor diameter portion as the linings wear whereby the spring engages a shoulder machined in an associated cylinder to move the piston toward the rotating disc as the brake pad friction material wears away.

A further object of this invention is the provision of automatic adjusting stop means to prevent objectionable noise resulting from the brake applying piston being rapidly thrust against the cylinder end surface.

A still further object of this invention is the provision of a brake applying piston associated with a disc brake assembly having an integral axially extending member with a stepped diameter wherein a coil spring having a rectangular cross section is wound thereabout so that as brake lining pad occurs rectangular coils are pressed off the extension major diameter and these coils engage a stop precisely positioning the piston with relation to the rotating brake disc.

Figure 1:
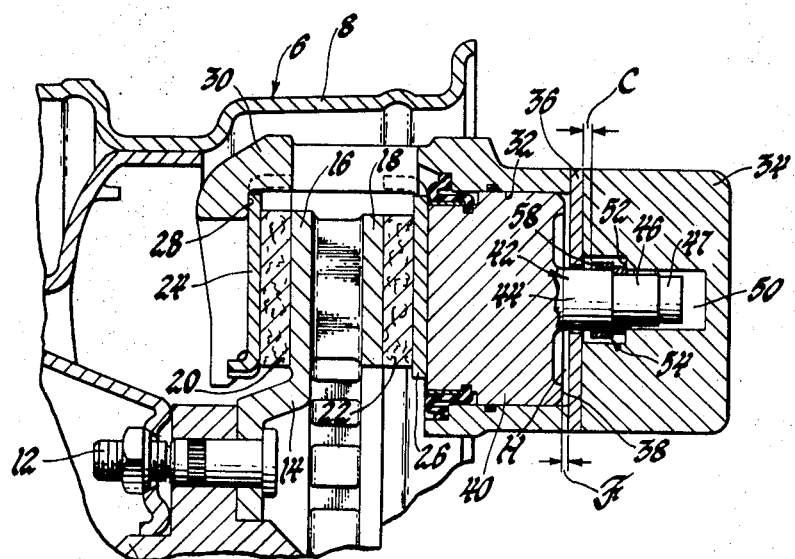
FIG. 1 is a partial cross section of a disc brake and wheel assembly illustrating the structure of this invention.

With reference to FIG. 1, a wheel assembly 6 is shown including rim 8 connected to a hub 10 by a plurality of bolts 12. The bolts 12 also secure a brake disc 14 to the hub 10. The brake disc 14 has braking surfaces 16 and 18, can be engaged by pads 20 and 22 attached to backing plates 24 and 26, the plate 24 engaging surface 28 of brake caliper 30. Caliper 30 is machined to contain a cylindrical bore 32 enclosed by a cap member 34 sealingly engaging a relatively soft metal gasket 36 to enclose end 38 of the cylinder 32. Piston 40 is slidably disposed within cylinder 32 and is connected with a cylindrical axially extending shaft or extension portion 42 formed to include a major diametrical portion 44 and a minor diametrical portion 46 along with terminal section 47. The minor portion 46 can obviously be provided by machining the shaft 42 to the reduced desired diameter.

Figure 2:
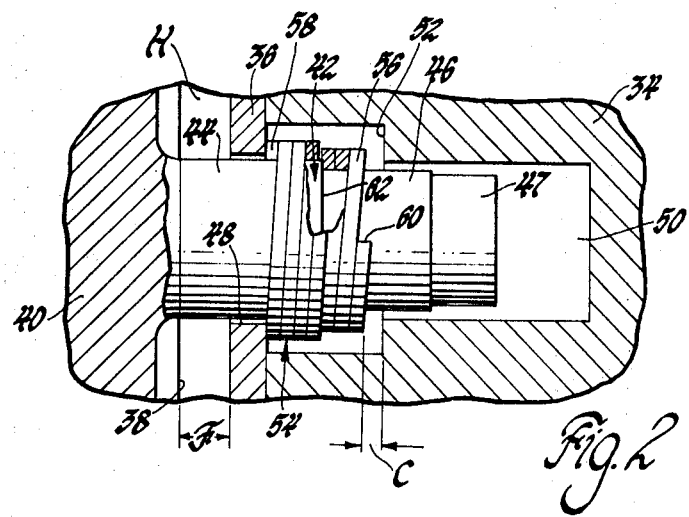
FIG. 2 is a partial cross-sectional view magnified to illustrate an axial extension of the brake applying piston.
Figure 3:
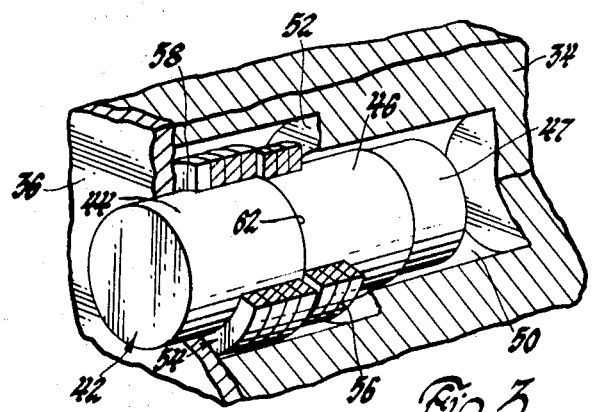
FIG. 3 is a pictorial view partly in section illustrating the piston extension in assembled relationship.

Referring now to FIG. 2, the gasket 36 contains a cylindrical aperture 48 receiving the major diametrical portion 44 of extension 42 within a stepped bore 50 in cap member 34. The stepped bore 50 includes abutment surface 52 for a purpose later described. A coil spring 54 is positioned on the major diametrical portion 44 and a specific number of coils 56 are moved therefrom onto the minor diametrical portion 46 during operation of the disc brake assembly.

As indicated in FIG. 2, coil spring 54 is positioned upon extension 42 such that engagement of lead end coil 58 with the metal plate 36 causes the coils 56 to drop off onto the minor diametrical portion 46 and in this manner provide and maintain a predetermined clearance C between lead end coil 58 and plate 36 or between abutment 52 and end coil 60 as pads 20 and 22 wear away. It is obvious that the clearance C determines the amount of free axial movement of the spring in either direction. Engagement of end coil 60 with abutment 52 results in coils 56 being wedged between the abutment and shoulder 62 on extension 42 thereby establishing a distance F between the plate 36 and end surface 38 of piston 40 in cylinder 32 which defines a chamber H.

In operation when the operator depresses the brake pedal and supplies pressure fluid to the chamber H which initially has a volume defined by the clearance F, a specific pressure is required by the operator to move the piston to the left, as viewed in FIG. 1, and engage the friction pads 20 and 22 with surfaces 16 and 18 of brake disc 14. Release of the brake pedal results in the piston 40 being biased to the right engaging end coil 60 with abutment 52 and limiting movement of the piston in a retracted direction. Operational use of the vehicle eventually results in wearing away of the brake pads 20 and 22 requiring the piston 40 to move a greater distance to apply the brakes. When sufficient wear occurs, a coil 56 moves down onto portion 46 of extension 42 as a result of end coil 58 engaging plate 36 when the piston is required to be further extended to apply the brakes. Consequently, more coils 56 of spring 54 are moved further to the right on extension 42. Positioning of the spring 54 further to the right on extension 42 results in an increase in the volume of oil required to fill chamber H as the distance F is increased. However, most hydraulic brake systems are closed systems and the chamber H is maintained full of oil by slightly depleting the master cylinder reservoir. In this manner, a substantially constant pressure is required to apply the brakes regardless of the degree of wear of friction pads 20 and 22. It is evident that the distance F between end surface 38 of piston 40 and plate 36 will vary approximately the width of one of the coils 56 until a new coil has been forced off surface 44 onto the smaller diametrical surface 46, thereby adjusting movement of the extension within the stepped chamber 50. In this manner, the piston 40 is prevented from moving to a position where a substantial portion of the operator's initial braking effort would only result in supplying fluid behind the piston prior to engagement and application of the brakes. In other words, the advantageous feature of employing the extension 42 is that it specifically positions the piston 40 with regard to the friction pads and maintains a constant clearance therebetween so that each application of the brakes requires substantially uniform movement of the piston to engage the pads and apply the brakes.

Severe cornering of a vehicle could result in a slight deflection of the brake disc 14 which would move the piston 40 out of position with relation to the friction pad causing the operator to be confronted with unusual pedal movement to engage the brakes. Utilization of the piston extension 42 also eliminates this situation by positively positioning the piston relative to the pad as mentioned above in that the coils 56 between shoulder 62 and abutment 52 positively stop movement of the piston in a retracting direction.

The above description of the preferred embodiment of this invention is for purposes of description only and obviously is not intended to limit the scope of the invention.

I claim:

1. In a vehicle brake assembly of the type including a disc brake caliper positioned in relation to a brake disc whereby friction pads are applied to opposite sides of the brake disc when the brakes are applied the improvement comprising: a piston reciprocably disposed within a cylinder contained by said brake caliper, a cap member enclosing one end of said cylinder containing a stepped bore axially aligned and connected with said cylinder, a shaft connected to one end of said piston and being slidably disposed within the stepped bore in said caliper, an abutment in said stepped bore at the step portion thereof, said shaft comprising a portion having a major diameter and a portion having a minor diameter, said portions being separated by a shoulder surface, a plate having an aperture receiving the major diametrical portion of said shaft and providing a predetermined clearance therebetween, said plate being positioned between said piston and said cap member, a coil spring having a rectangular cross section being positioned upon said major diametrical portion of said shaft, movement of said shaft with the piston in a brake applying direction engaging a first end of said spring with said plate and axially forcing respective coils of said spring onto the minor diametrical shaft portion as wear of the friction pads progresses, and a second end of said spring engaging said abutment, said abutment and said shoulder surface engaging said spring limiting retracted movement of the piston while positively positioning said spring therebetween maintaining a constant required brake applying movement.

2. In a conventional vehicle disc brake assembly including caliper supported brake pads disposed on either side of a brake disc and actuated by a piston movable within a cylinder in the caliper in response to pressurized hydraulic fluid the improvement comprising: a shaft attached to said piston and extending axially away from the disc brake assembly, a closure cap enclosing the end of the cylinder remote from the disc brake assembly, said cap containing a stepped cylindrical bore reciprocably receiving said shaft, an abutment surface at the step in said bore, said shaft being machined to have a reduced diameter, a shoulder surface on said shaft facing said abutment, a plate containing an orifice receiving said shaft being positioned between said piston and said cap member and providing a stop surface, and a resilient rectangular cross section spiral spring disposed upon said shaft, movement of the piston in a brake applying direction resulting in said spring engaging said plate stop surface and moving a coil of said spring off onto the reduced diameter surface of said shaft, said piston moving a greater distance toward the brake applying position as the brake pads wear moving more of said spring onto said shaft reduced diameter surface, movement of the piston to a retracted position being positively limited by the portion of said spring positioned between said shoulder and said abutment, said piston being positively positioned a predetermined distance from said brake pads so that the pressure required to apply the brakes remains substantially constant.